US005268683A

United States Patent [19]

Stolarczyk

[11] Patent Number: 5,268,683

[45] Date of Patent: Dec. 7, 1993

[54] METHOD OF TRANSMITTING DATA FROM A DRILLHEAD

[75] Inventor: Larry G. Stolarczyk, Raton, N. Mex.

[73] Assignee: Stolar, Inc., Raton, N. Mex.

[21] Appl. No.: 964,215

[22] Filed: Oct. 21, 1992

Related U.S. Application Data

[62] Division of Ser. No. 851,563, Mar. 16, 1992, Pat. No. 5,181,934, which is a division of Ser. No. 732,813, Jul. 19, 1991, Pat. No. 5,121,971, which is a division of Ser. No. 557,907, Aug. 16, 1990, Pat. No. 5,087,099, which is a division of Ser. No. 239,771, Sep. 2, 1988, Pat. No. 4,968,978.

[51] Int. Cl.[5] .............................................. G01V 1/00

[52] U.S. Cl. ............................. 340/854.4; 340/854.6; 340/854.8; 175/40

[58] Field of Search ............... 340/853.6, 854.4, 854.6, 340/854.8, 854.5; 175/40

[56] References Cited

U.S. PATENT DOCUMENTS

| | | | |
|---|---|---|---|
| Re. 32,563 | 12/1987 | Stolarczyk | 324/334 |
| 4,072,349 | 2/1978 | Hartley | 299/1 |
| 4,348,672 | 9/1982 | Givler | 340/854.4 |
| 4,525,715 | 6/1985 | Smith | 340/854.4 |
| 4,725,837 | 2/1988 | Rubin | 340/854.4 |
| 4,742,305 | 5/1988 | Stolarczyk | 323/334 |
| 4,753,484 | 6/1988 | Stolarczyk | 299/1 |
| 4,839,644 | 6/1989 | Safinya | 340/854 |

OTHER PUBLICATIONS

"Control and Monitoring via Medium Frequency Techniques and Existing Mine Conductors", Harry Dobroski, IEEE Transactions, Jul./Aug. 1985.

"Long and Short Range Multiple Point Wireless Sensor Data Transmission System", L. Stolarczyk Nov. 7, 1986.

"Antenna Theory", Robert E. Collins, Francis J. Zucker Inter-University Electronics Series vol. 7.

"Time-Harmonic Electromagnetic Fields", Roger F. Harrington, for McGraw-Hill, 1961.

*Primary Examiner*—J. Woodrow Eldred
*Attorney, Agent, or Firm*—Thomas E. Schatzel

[57] ABSTRACT

A method for remotely monitoring conditions such as carbon monoxide or methane gas concentration, longwall roof support pressure, machine parameters or uncut coal, trona or potash layer thickness in a natural resource mining system such as a longwall or continuous mine system. The method utilizes a plurality of sensors connected to low magnetic moment transmitters, e.g. 0.1 $ATM^2$, or high magnetic moment transmitters, e.g. 2.5 $ATM^2$, that transmit collected data during multiple short burst transmission periods. Prior to transmission, the data is converted to a digital word format. An algorithm in the transmitter microcomputer ensures that random time intervals exist between data transmission bursts thus preventing a data transmission clash at the central receiver. A microcomputer algorithm in the central receiver protects against data contention caused by simultaneous transmission from several sensors. The data is transmitted to the central receiver either through a natural waveguide pathway or through a utility conductor that is magnetically coupled to the transmitter and central receiver by properly oriented electrically short magnetic dipole antennas. The method can be used, for example, to automatically control the positioning of a plurality of longwall roof supports or to transmit data from a longwall drillhead, along the drill rod, to the central receiver. Data can be communicated between a remote location and a surface area by utilizing a system of repeaters inductively coupled to a utility conductor. Use of the repeater system permits operation of mining machines from a surface computer.

2 Claims, 3 Drawing Sheets

FIG. 4
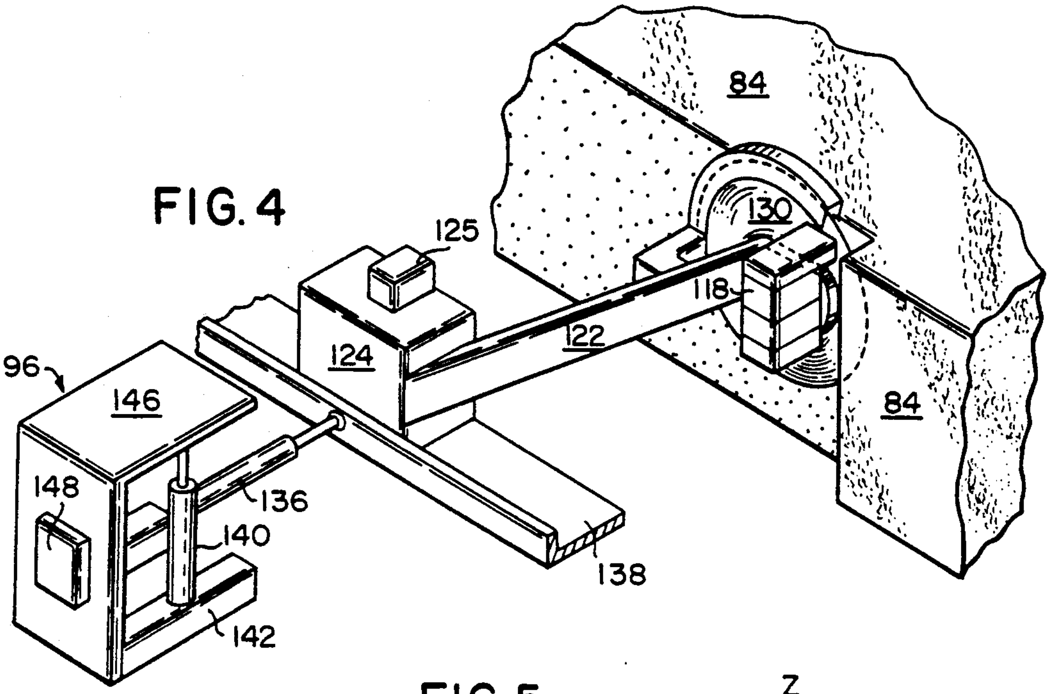
FIG. 5
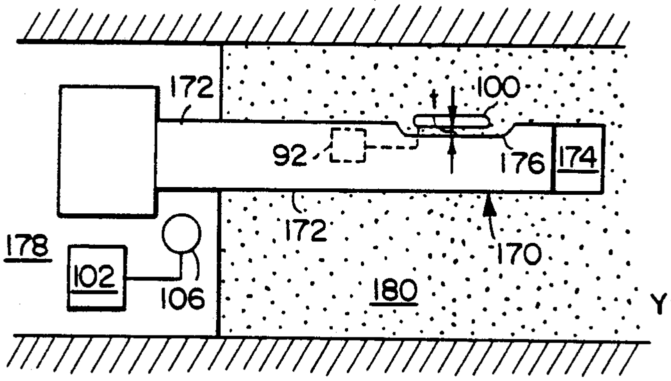
FIG. 6
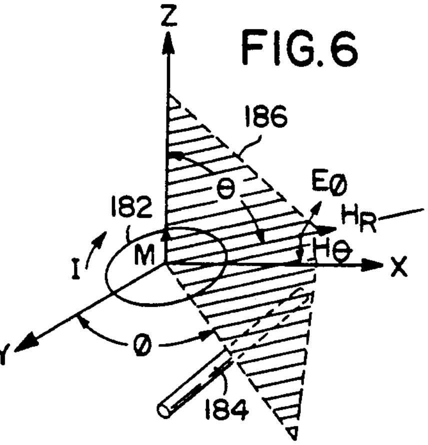
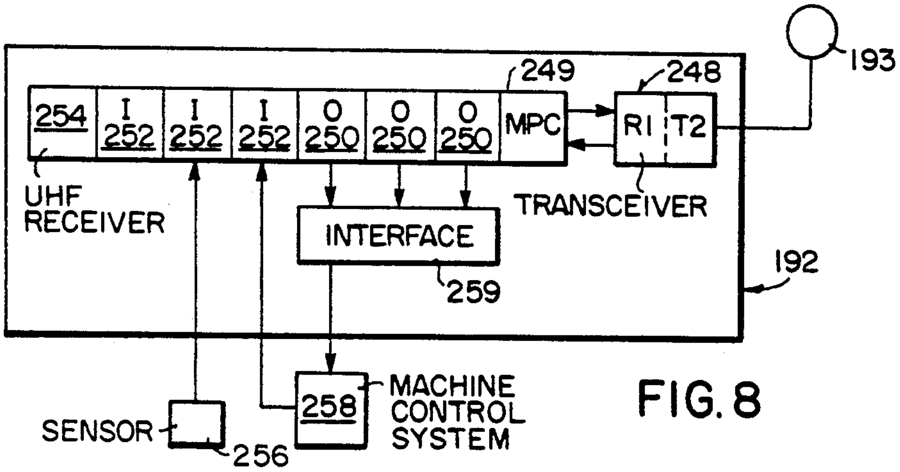
FIG. 8

FIG. 7
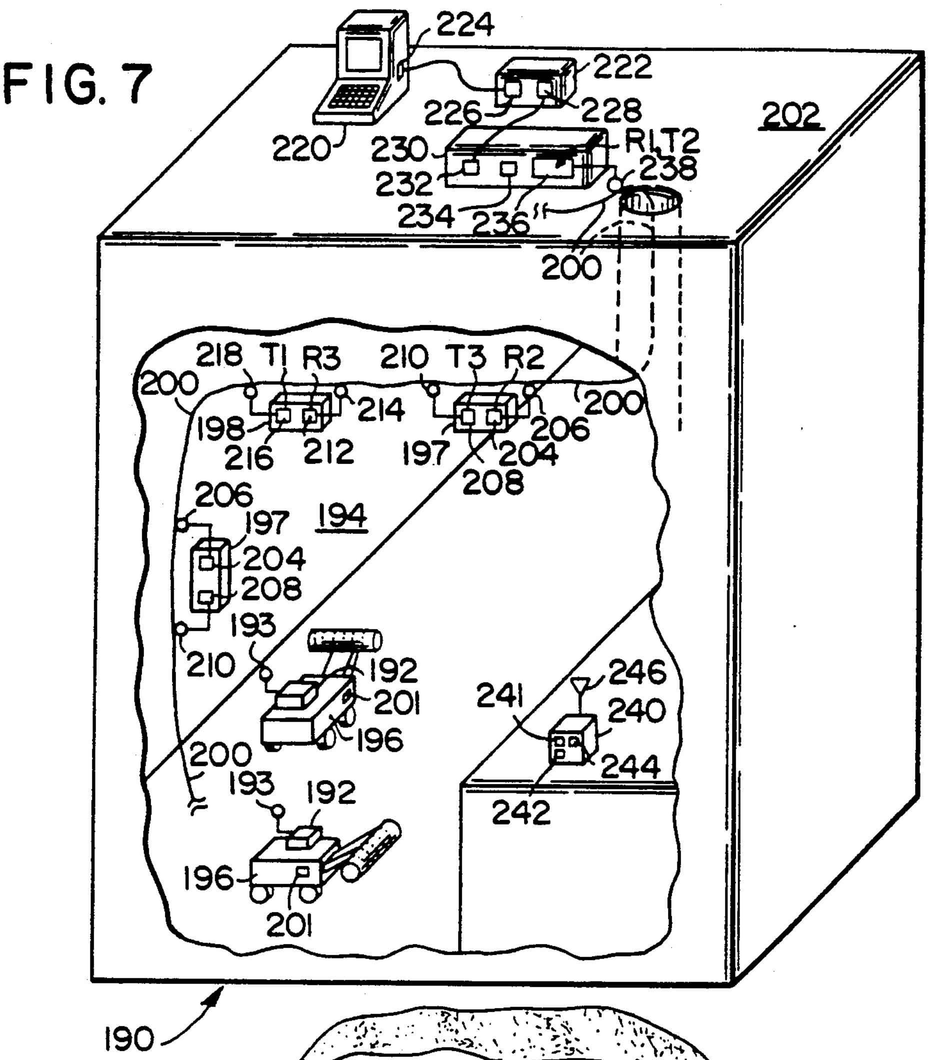
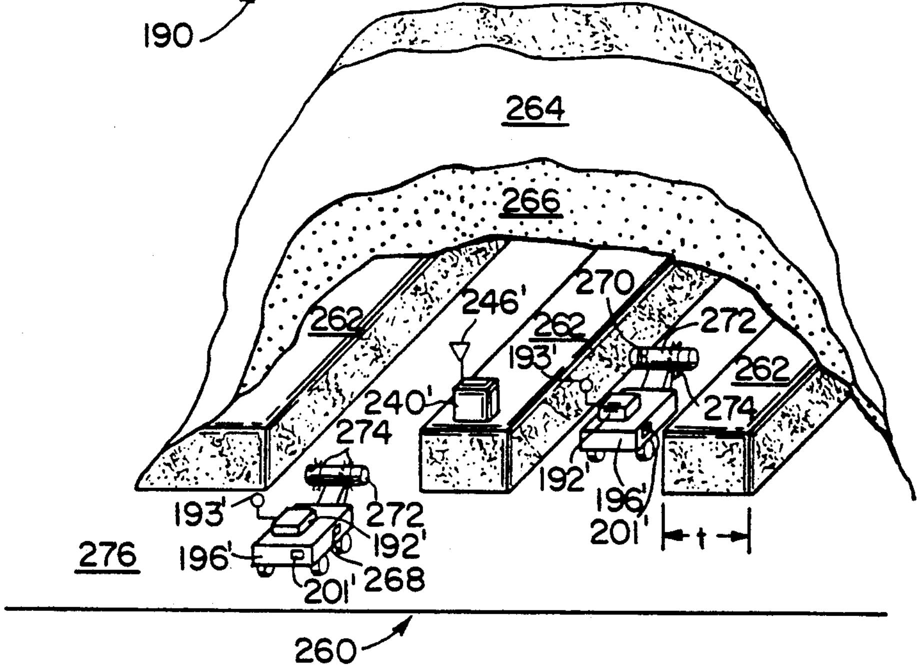
FIG. 9

METHOD OF TRANSMITTING DATA FROM A DRILLHEAD

This is a divisional of copending application Ser. No. 07/851,563, U.S. Pat. No. 5,181,934, filed on Mar. 16, 1991, which is a divisional of Ser. No. 07/732,813, filed on Jul. 19, 1991, now U.S. Pat. No. 5,121,971; which was a divisional of Ser. No. 07/557,907, filed on Aug. 16, 1990, now U.S. Pat. No. 5,087,099; which was a divisional of Ser. No. 07/239,771, filed Sept. 2, 1988, now U.S. Pat. No. 4,968,978.

BACKGROUND OF THE INVENTION

1. Field of the Invention

The present invention relates generally to a method for transmitting data in underground mines and more particularly to a method which utilizes burst transmission of digitally encoded radio signals transmitted by inductive coupling of a transmitter and a receiver to utility conductors and natural wave guide seams using electrically short magnetic dipole antennas.

2. Description of the Prior Art

An elementary experimental data telemetry system for use in a coal mine is briefly described by Dobroski and Stolarczyk in *Control and Monitoring via Medium-Frequency Techniques and Existing Mine Conductors,* IEEE Transactions On Industry Applications, vol.IA-21, July/Aug. 1985, p. 1091. This system utilizes spontaneous short bursts of digitally encoded medium frequency radio signals transmitted through electrical conductors existing in the mine. The paper teaches the use of line couplers as a means of coupling signals onto the local wiring. The type of sensor used for data collection was not described. Nor was a method given for avoiding data collision when transmissions occur simultaneously from several sensors or of using repeaters to communicate between surface and remote points in underground mines. Additionally, polling techniques were not described.

The features of a multiple point wireless data transmission system are described more completely in a proprietary technical proposal prepared by L. Stolarczyk and J. Jackson, entitled "Long and Short Range Multiple Point Wireless Sensor Data Transmission System", dated Nov. 7, 1986. This proposal discloses the use of high and low magnetic moment transmitters, spontaneous burst transmission techniques, the use of a sleep-timer interface circuit and the use of tuned loop antennas to inductively couple utility conductors and natural wave guide modes. Polling techniques, however, were not described.

In U.S. Pat. No. 4,753,484, issued to L. G. Stolarczyk on Jun. 28, 1988, the use of a coal rock sensor to remotely control a cutting machine was described.

U.S. Pat. Re. 32,563, issued to L. G. Stolarczyk for "Continuous Wave Medium Frequency Signal Transmission Survey Procedure For Imaging Structure In Coal Seams" (Stolarczyk '563), describes the use of tuned loop antennas to excite the coal seam transmission mode. In Stolarczyk '563, medium frequency radio waves are used to create images of geological anomalies occuring in coal seams.

In U.S. Pat. No. 4,742,305, issued to L. G. Stolarczyk for "Method for Constructing Vertical Images of Anomalies in Geological Formations", the technique of Stolarczyk '563 was extended to include imaging in a vertical plane and the use of tuned loop antennas to excite the natural coal seam mode of transmission was further described.

The fact that in the vicinity of a magnetic dipole, little energy is dissipated because the wave impedance is imaginary, is described by J. R. Wait in "Antenna Theory", McGraw Hill Book Co., Chapter 24, (R. E. Collin and F. S. Zucker editors, 1969).

The relationship between the current induced in a utility conductor and the electric field is described by R. F. Harrington in "Time-Harmonic Electromagnetic Field", McGraw Hill Book Co., p. 234 (1961).

SUMMARY OF THE PRESENT INVENTION

It is therefore an object of the present invention to provide a reliable method of data transmission from a resource medium.

It is another object of the present invention to provide a method of spontaneous data transmission from a resource medium in which sensor and transmitter battery life is prolonged.

It is another object of the present invention to provide a method of spontaneous data transmission from a resource medium in which a plurality of sensors can be monitored by a single receiver.

It is another object of the present invention to provide a method of data transmission from a resource medium in which monitoring points can be moved or quickly changed.

It is another object of the present invention to provide a method of data transmission from a resource medium in which the risk of transmission cable failure is eliminated.

It is another object of the present invention to provide a method for automatically adjusting the cutting edge position of a coal cutting machine.

It is another object of the present invention to provide a method for automatically changing the position of the roof supports in a longwall mine.

It is another object of the present invention to provide a method for transmitting data from the head of a drill rod.

It is another object of the present invention to provide a method for polled data transmission to and from mining equipment in a natural resource medium.

It is another object of the present invention to use inductively coupled repeaters to communicate data between a surface computer and remote points in an underground mining complex.

It is another object of the present invention to send real time coal layer thickness data from a sensor to a mining machine.

Briefly, the preferred embodiment of the present invention includes a plurality of data transmission units comprising monitoring sensors connected to low magnetic moment transmitters (LMMT) or to high magnetic moment transmitters (HMMT). The data transmission units are controlled by a microcomputer and a sleep-timer interface which spontaneously and periodically activiate the sensor and transmitter and initiate the transmission of multiple short duration bursts of low medium frequency radio signals. In a polled system, the sleep-timer interface is replaced by a receiver which responds to an assigned identification code.

Data collected by the sensors is converted into a digital word format by a microcomputer. A series stream of digital data is sent from the microcomputer to a minimal phase shift key (MSK) modem where it is used to modulate a frequency modulated (FM) carrier signal generated by the transmitter. The modulated FM radio signal is transmitted to a central receiver by inductive coupling the transmitter and central receiver to a utility conductor using an electrically short magnetic dipole antenna, e.g. a tuned loop antenna or a ferrite rod antenna. Additionally, the electrically short magnetic dipole antenna excites natural waveguide modes existing in a natural resource medium such as a coal mine. At the central receiver in a spontaneous transmission system, or at a base station receiver in a polled system, the modulated FM radio signal is demodulated and the data is outputted. An algorithm in a microcomputer associated with the central receiver verifies the validity of the data by checking the parity and number of bits received and by demanding repetition of the data. The data can be sent to a control and monitoring computer for further data processing.

In a spontaneous transmission system, an algorithm in a microcomputer associated with the transmitter ensures that the multiple bursts of data will occur at random intervals. This reduces the likelihood of data contention at the central receiver and permits a single receiver to monitor a plurality of sensors.

The sensors can be used to monitor machine, geological or environmental parameters in the natural resource medium. For example, carbon monoxide or methane gas concentration, longwall roof support pressure or uncut coal thickness can be monitored. Data on uncut coal thickness can be transmitted directly to the coal cutting machine and can be used to automatically change the position of the machine cutting edges or the position of the longwall roof supports. By mounting the uncut coal thickness sensor on the cutting drum, real time control of position can be achieved. In another application, a data transmission unit is located inside of a drill rod and data is transmitted from the drill head to the central receiver by induction to the drill rod.

To achieve minewide communications between a surface control and monitoring computer and a remote location in the mine, a plurality of repeaters are inductively coupled to utility conductors in the mine. The repeaters communicate on a low frequency carrier signal ($F_3$) where attenuation rates are low. A base or remote monitoring point communicates a signal on a frequency $F_2$ which cause the repeater to retransmit the signal at the frequency $F_3$. A separate repeater receives the $F_3$ signal and retransmits the signal at a frequency $F_1$ which can be received by equipment in the mine. Thus, control data can be transmitted from the surface control and monitoring computer, through the repeater network, to a remote control point. Similarly, sensor data can be transmitted from the remote point, back through the repeater network, to the surface control and monitoring computer.

An advantage of the present invention is that the use of multiple random bursts of data reduces data contention at the receiver.

Another advantage of the present invention is that transmitter battery life is prolonged by use of the sleep-timer and short burst radio signal techniques.

Another advantage of the present invention is that a plurality of sensors can be monitored by a single central receiver.

Another advantage of the present invention is that the use of electrically short magnetic dipole antennas allows both conductor mode and natural wave guide mode transmission to occur.

Another advantage of the present invention is that the risk of transmission cable failure is reduced.

Another advantage of the present invention is that data can be transmitted from a drill head to a central receiver.

Another advantage of the present invention is that the position of mine equipment can be automatically changed or controlled from a surface computer.

Another advantage of the present invention is that the repeater network enables the use of existing electrical conductors in the mine for transmission of control and monitoring signals.

Another advantage of the present invention is that a polling system can be used to control and monitor equipment at a remote point in an underground mine.

Another advantage of the present invention is that real time coal layer thickness data can be transmitted to a mining machine or control and monitoring location.

These and other objects and advantages of the present invention will no doubt become obvious to those of ordinary skill in the art after having read the following detailed description of the preferred embodiment which is illustrated in the various drawing figures.

IN THE DRAWING

FIG. 4 is a top elevational view of a longwall shield;

FIG. 5 is a side view of a measurement while drilling apparatus of the present invention;

FIG. 6 shows the proper orientation of an electrical conductor and a loop antenna according to the present invention;

FIG. 7 is a schematic diagram of a polled data transmission system according to the present invention;

FIG. 8 is a block diagram of a remote monitoring and control unit; and

FIG. 9 is a schematic diagram of a punch mining control system according to the present invention.

DETAILED DESCRIPTION OF THE PREFERRED EMBODIMENT

Figure 1:
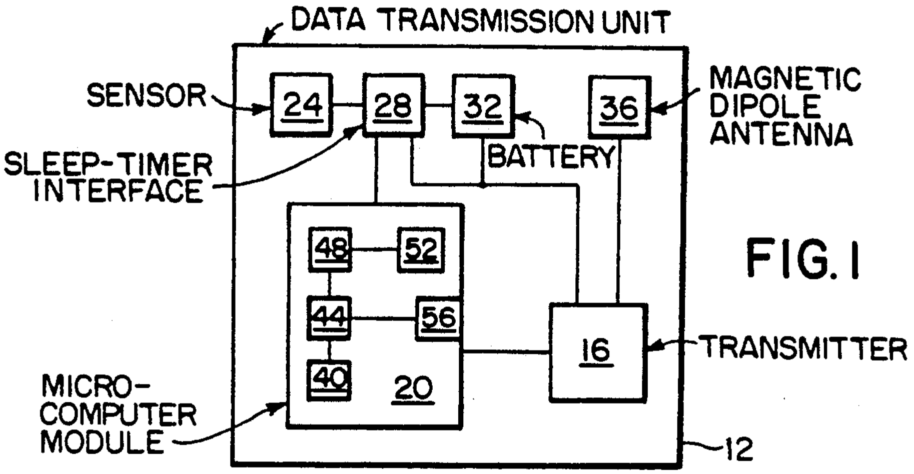
FIG. 1 is a block diagram of a data transmission unit according to the present invention.

FIG. 1 shows a block diagram of the electronic components associated with a spontaneous data transmission unit 12. The data transmission unit 12 comprises a transmitter 16, a microcomputer printed circuit (MPC) module 20, a sensor 24, a sleep-timer interface 28, a battery 32 and an electrically short magnetic dipole antenna 36.

The transmitter 16 is a frequency modulated (FM) transmitter including a receiving unit. Typically, the transmission unit 12 is capable of monitoring eight analog channels.

The MPC module 20 comprises a minimal phase shift key (MSK) modulator/demodulator (modem) 40, a microcomputer 44, an analog-to-digital converter 48, a multiplexer 52 and an RS-232 port 56.

The microcomputer 44 could be a standard 8-bit CMOS microcomputer with 2K byte electrically erasable programmable read only memory (EEP ROM).

The magnetic dipole antenna 36 is electrically connected to the transmitter 16 and can be an electrically short magnetic dipole antenna such as a ferrite rod antenna or a tuned loop antenna.

The sensor 24 is electrically connected to the sleep-timer interface 28 and functions to generate data relevant to a specified operation. For example, the sensor 24 could be a machine parameter sensor, a geological sensor, an environmental sensor, or uncut coal sensor. As a machine parameter sensor, the sensor 24 is capable of measuring, for example, at least one of a general group of mechanical parameters such as hydrolic pressure, motor current, inclination angle, pitch or yaw. As a geological sensor, the sensor 24 is capable of measuring at least one of a general group of geological parameters such as stress, pressure or force. As an environmental sensor, the sensor 24 is capable of measuring at least one of a general group of environmental parameters such as carbon monoxide or methane gas concentration, air velocity or dust concentration. As an uncut coal sensor, the sensor 24 is capable of measuring the thickness of a coal, trona or potash layer and may be any of several types of coal rock sensors such as a horizon sensor, which measures electrical conductance of an antenna, or a sensor that measures background radiation.

The sensor 24, the transmitter 16, the sleep-timer interface 28 and the MPC module 20 are all powered by the battery 32 which can be an intrinsically safe battery. The sleep-timer interface 28 is used to electrically condition signals from the sensor 24 and transmitter 16 and to periodically switch on power to the sensor 24.

Figure 2:
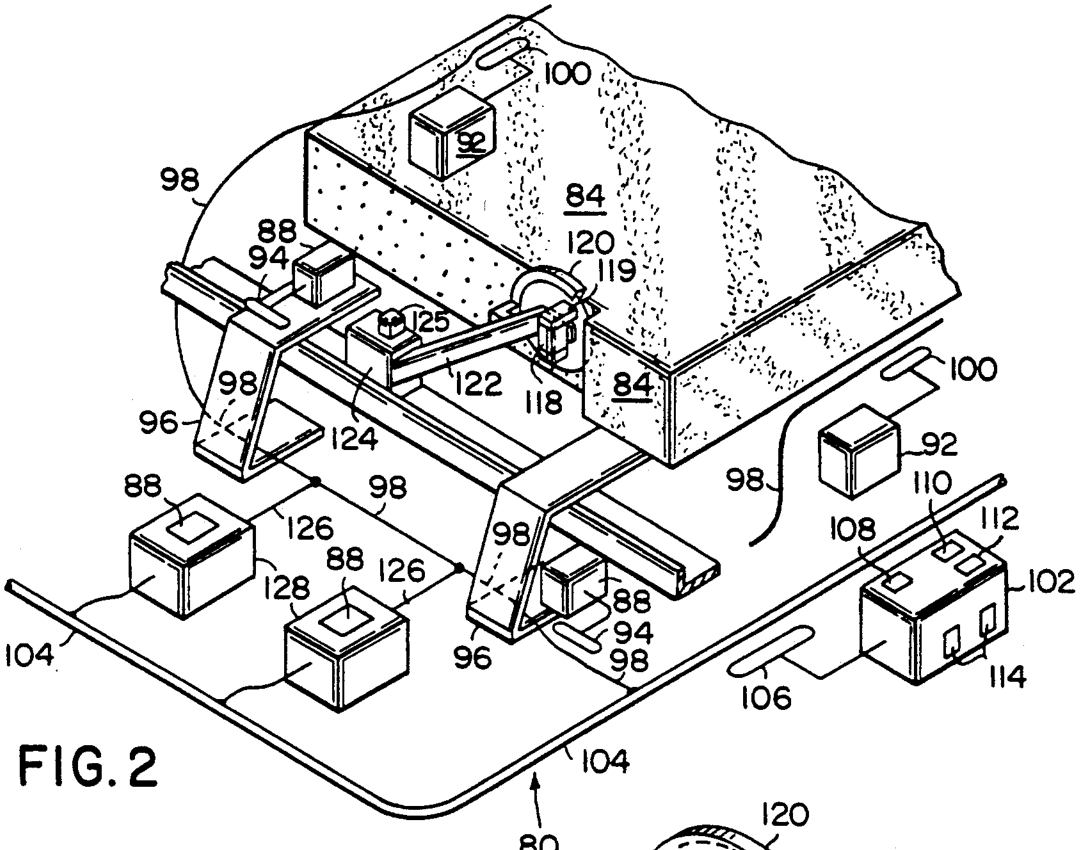
FIG. 2 is a top elevational view of a multiple point wireless monitoring system according to the present invention.

FIG. 2 shows a multiple point wireless monitoring system designated by the general reference numeral 80. The system 80 can be used to remotely monitor conditions in a natural resource medium such as an underground coal, trona or potash deposit 84. The system 80 includes a plurality of low magnetic moment (LMM) spontaneous data transmission units 88 and a plurality of high magnetic moment (HMM) data transmission units 92. The LMM units 88 comprise all the components of the data transmission unit 12 with the transmitter 16 operating at a low magnetic moment, e.g. 0.1 $ATM^2$ (ampere turn per square meter) and the antenna 36 comprises a ferrite rod antenna 94. The LMM units 88 are situated near a plurality of longwall shields 96, e.g. under or on top of the shields 96. Each LMM unit 88 utilizes the antenna 36 to induce current flow in a nearby electrical conductor 98 which can be for example, a utility conductor such as an AC power cable, a wire rope, a telephone or other communication cable, a water pipe or a conveyor belt structure.

The HMM units 92 comprise all the components of the data transmission unit 12 with the transmitter 16 operating at a high magnetic moment, e.g. 2.5 $ATM^2$ and the antenna 36 comprising an electrically short magnetic dipole antenna such as a thirty inch vertical tuned loop antenna 100. The HMM units 92 utilize the antenna 100 to inductively couple the electrical conductors 98 as well as the natural waveguide modes as hereinafter discussed.

A central receiver unit 102 is inductively coupled to a set-up room cable 104 by an antenna 106. The antenna 106 can be an electrically short magnetic dipole antenna such as the thirty inch vertical tuned loop antenna 100. The central receiver unit 102 includes a frequency modulated (FM) transceiver 108, a minimal phase shift key (MSK) modulator/demodulator (modem) 110, a microcomputer 112 and a plurality of input/output ports 114 for communicating with electrical components, such as a data recorder, commonly associated with the microcomputer 112. Typically, the microcomputer 112 would comprise a standard 8 bit microcomputer with 32K byte nonvolatile electrically programmable random access memory.

An uncut resource layer detector 118, containing the LMM unit 88 and the sensor 24 in the form of an uncut coal sensor 119, can be positioned near the coal deposit 84 and can be attached to a cowl 120 or a ranging arm 122 of a coal cutting machine 124, e.g. a longwall shearer. A machine automation control unit (MACU) 125 is electrically connected to the control system of the machine 124.

A plurality of steel cables 126 can be released between the longwall shields 96 as they progress into the coal deposit 84. One or more of the LMM units 88 can be contained within a metal enclosure 128 and can be magnetically coupled to the steel cables 126 by the antenna 94. The steel cables 126 can be electrically connected to the electrical conductor 98 and the set-up room cable 104 to provide alternative communication paths to the central receiver unit 102. The metal enclosure 128 protects the LMM unit 88 from being damaged.

Figure 3:
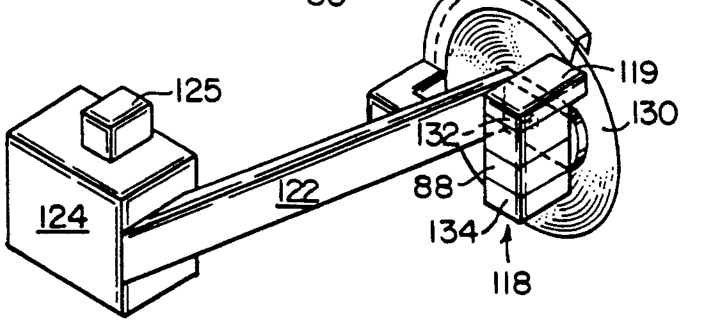
FIG. 3 is a side view of a coal layer detector of the present invention.

FIG. 3 shows the detector 118 in more detail. The detector 118 is located near a cutting drum 130 of the coal cutting machine 124 and is connected to the ranging arm at a pivot point 132. A counterweight 134, located near the bottom of the detector 118, keeps the detector 118 hanging about the pivot point 132 in an approximately vertical orientation. In the preferred embodiment, the coal rock sensor 119 measures electrical conductance as described in U.S. Pat. No. 4,753,484 issued to L. G. Stolarczyk on Jun. 28, 1988 and is known in the trade as a horizon sensor. The thickness of an uncut resource layer, e.g. coal, potash or trona can be measured by the detector 118. As described previously, the LMM unit 88 comprises the data transmission unit 12 and the ferrite rod antenna 94.

FIG. 4 shows the longwall shield 96 in more detail. A horizontal hydraulic ram 136 mechanically connects the longwall shield 96 to a pan line 138. A vertical hydraulic ram 140 is mechanically connected between a shield base 142 and a shield roof support 146. A roof support automation control unit (RSACU) 148 is attached to the shield 96. The RSACU 148 and the MACU 125 comprise electronic components equivalent to those contained in the central receiver unit 102. Specifically, a microcomputer, a transceiver, a minimal phase shift key modem, an input/output port and an antenna as is shown in more detail in FIG. 8.

FIG. 5 shows a measurement while drilling apparatus, designated by the general reference numeral 170, which is an alternative embodiment of the multiple point wireless monitoring system 80. In the drilling apparatus 170, the HMM unit 92 is located inside an electrically conductive drill rod 172, such as the type used in longhole drilling operations, in the proximity of a drilling motor 174. An indentation 176 is milled into the surface of the drillrod 172 for accepting the antenna 100 which is electrically connected to the HMM unit 92. In this embodiment, the antenna 100 could be a 30 to 40 inch tuned loop antenna and would be located in the meridian plane with respect to the axial center line of the drill rod (see FIG. 6). A distance "t" of approximately 3/16 inches would separate the antenna 100 from the surface of the drillrod 172. The antenna 100 could be surrounded by a protective material such as a "fired" ceramic materials. In the drilling apparatus 170, the sensor 24 would typically be in the form of a geological sensor.

The central receiver unit 102 is located in an air filled room 178 near the opposite end of the drillrod 172 from the drilling motor 174. The drillrod 172 could be any type of electrically conductive drill used for drilling into a geological medium 180, such as coal or rock. The orientation of the drillrod 172 is irrelevant and could be vertical, horizontal or angled.

FIG. 6 shows the proper orientation of a vertical magnetic dipole antenna 182 with respect to an electrical conductor 184. The cartesian coordinate system (x, y, z,) is oriented so the antenna 182 lies in the horizontal x-y plane with its vertical magnetic moment M aligned along the z axis. The spherical coordinate system ($\theta$, $\phi$, r) is used to describe the general orientation of the electromagnetic field components $E_\phi$, $H_r$ and $H_\phi$.

A meridian plane 186 contains the magnetic field component $H_r$ and $H_\theta$ and the electric field $E_\phi$ is always orthogonal to the meridian plane 186 in the $\phi$ direction. When the longitudinal axis of an electrical conductor 184 lies in the same direction as $E_\phi$, the amount of current induced in the conductor 184 by the antenna 182 is maximized.

FIG. 7 shows a polled data transmission system designated by the general reference numeral 190 which is an alternative embodiment of the present invention. In the system 190, a plurality of remote monitoring and control units 192 are located in a mine 194. Each control unit 192 includes an antenna 193. The units 192 can be positioned on a plurality of mining machines 196 which could be the coal cutting machine 124 or the longwall shields 96. A plurality of access repeaters 197 and a plurality of listening repeaters 198, positioned in close physical proximity to a utility conductor 200, are also located in the mine 194. A transceiver 201 capable of transmitting a signal of frequency $F_4$ and receiving a signal of frequency $F_5$ can be positioned on the machines 196. The utility conductor 200 could be any electrical conductor running from a surface region 202 through the mine 194. For example, the conductor 200 could be any of the electrical conductors 98 described previously. The access repeater 197 comprises a receiver 204, a receiver antenna 206, a transmitter 208 and a transmitter antenna 210. Similarly, the listening repeater 198 comprises a receiver 212, a receiver antenna 214, a transmitter 216 and a transmitter antenna 218. The receiver antennas 206 and 214 and the transmitter antennas 210 and 218 are electrically short magnetic dipole antennas such as the antenna 36 and provide inductive coupling to the utility conductor 200. The antennas 206, 214, 210 and 218 can be loop antennas with the coils sandwiched between protective plastic strips to form the loop antenna. The transmitters 208 and 216 and the receivers 204 and 212 are capable of transmitting and receiving signals, respectively, in the low to medium frequency range. The transmitter 208 transmits a signal having a frequency $F_3$ in the low frequency range (abbreviated as $T_3$ for transmit frequency $F_3$) while the transmitter 216 transmits a signal having a frequency $F_1$ (abbreviated $T_1$) that is not equal to $F_3$. The receiver 204 is capable of receiving signals having a frequency $F_2$ (abbreviated $R_2$) which is not equal to $F_1$ or $F_3$. The receiver 212 is capable of receiving signals having the frequency $F_3$ (abbreviated R3).

On the surface region 202, a control and monitoring computer 220 is electrically connected to a remote audio unit 222 via a port 224 such as a standard RS 232 port . The unit 222 comprises a microcomputer printed circuit (MPC) module 226, such as the MPC module 20 that was previously described, and an audio line pair driver 228. The driver 228 has receiving and transmitting capability to enable two-way communications with a base station 230. The base station 230 comprises an audio driver 232, electrically connected to the driver 228, an MPC module 234, a transceiver 236 and an antenna 238. The antenna 238 is an electrically short magnetic dipole antenna that inductively couples the transceiver 236 to the utility conductor 200. The transceiver 236 is capable of receiving the frequency $F_1$ and of transmitting the frequency $F_2$. The MPC module 234 comprises the same components as the MPC module 20.

A plurality of passive transponders 240 are located in the mine 194. The transponders 240 comprise a tuned loop antenna 241, a capacitor 242, a UHF transmitter 244 and a UHF antenna 246.

FIG. 8 shows the remote monitoring and control unit 192 in more detail. The antenna 193, which is an electrically short magnetic dipole antenna, is electrically connected to a transceiver 248 that is capable of transmitting signals having frequency $F_2$ and of receiving signals having the frequency $F_1$. The transceiver 248 is electrically connected to a microcomputer printed circuit (MPC) module 249, such as the MPC module 20. The MPC unit 249 is connected to a plurality of output circuits 250 (abbreviated as O) and a plurality of input circuits 252 (abbreviated as I). An ultrahigh frequency (UHF) receiver 254 is connected to the input circuits 252. External systems such as a sensor 256 or a machine control system 258 can be connected to the input circuits 252. The sensor 256 could be any of the types of sensors previously described with respect to the sensor 24. The machine control system 258 could be a relay or an electrohydraulic control system such as the control system of the machine 124 or the electrohydraulic control system of the longwall shield 96. The remote monitoring and control unit 192 could function as the MACU 125, shown in FIG. 2, or as the RSACU 148 shown in FIG. 4. The output circuits 250 are electronically connected to an interface unit 259 which is electronically connected to the machine control system 258.

FIG. 9 shows a punch mine system, represented by the general reference numeral 260, which is an alternative embodiment of the polled data transmission system 190 shown in FIG. 7. Elements in the system 260 that are identical to elements in FIG. 7 are referenced by the same number distinguished by a prime symbol. In the system 260, a plurality of uncut coal ribs 262 are left in a mountain top coal seam 264 to support a roof rock section 266. The ribs 262 have a thickness "t" which must be sufficient to support the roof rock section 266. Generally, a thickness of forty inches is adequate. The coal cutting machines 196′ can have a body mounted coal thickness sensor 268 mounted on the surface of the machine 196′ or a drum mounted coal thickness sensor 270. The sensors 268 and 270 could be the uncut coal sensor 119 described previously with the preferred embodiment being the sensor that measures electrical conductance as described in U.S. Pat. No. 4,753,484 issued to L. G. Stolarczyk on Jun. 28, 1988. For the drum mounted sensor 270, the body of the sensor is mounted in or on a cutting drum 272 and the antenna is mounted on a vein 274 which contains the cutting bits of the drum 272. The cutting drum 272 could be, for example, on either a continuous mining machine or on a longwall shearer. The positioning of the sensor 270 on the cutting drum 272 permits real time measurement of uncut thickness of floor and roof coal, trona or potash layers. By utilizing the sensors 268 or 270 and the remote monitoring and control units 192', the mining machines 196' can be remotely controlled from a roadway 276 or other safe area. Use of the sensors 268 or 270 permits the thickness "t" of the ribs 262 to be maintained at a value adequate to ensure proper support of the roof rock section 266.

The functioning of the multiple point wireless monitoring system 80 and the measurement while drilling apparatus 170 and the polled data transmission system 190 can now be explained. Referring to FIG. 1, at preprogrammed intervals the sleep-timer interface 28 causes power from the battery 32 to be supplied to the transmitter 16, the microcomputer module 20 and the sensor 24. Data collected by the sensor 24, either as analog current, voltage or relay contact position etc., is converted into a digital word format by the analog-to-digital converter 48. The transmitter 16 is then activated (keyed) and a series stream of digital data is sent to the MSK modem 40 for use as the modulation signal for the transmitter 16. The modulated signal is then transmitted to the central receiver unit 102.

Conversion of the data collected by the sensor 24 into a digital word format is accomplished by switching the analog signal via the multiplexer 52 from the sensor 24 to an input terminal of the analog-to-digital converter 48. The converted digital signal is routed to the microcomputer 44 where it may be corrected and stored in RAM for later transmission. The serial data is sent to the MSK modem 40 and the MSK modem output signal frequency modulates (FM) a carrier signal in the low or medium frequency (MF) band. A digital sigal large "1" is representation, for example, a 1200 Hz audio tone signal and a logic "0" signal by, for example, an 1800 $H_z$ audio tone signal. The resulting two frequency MSK modulation signal is applied to the narrow band FM transmitter 16 for transmission to the central receiver unit 102.

Each transmission from the transmitter 16 contains 32 or more data bits. Each data word is divided into three segments: a preamble segment, a one bit start segment and an identification and data containing segment.

In order to enable the central receiver unit 102 to receive data from several sensors in a short period of time, a data receiving scheme is required to prevent data contention (clash). In the data receiving scheme of the preferred embodiment, the transmitter 16 is activated only for the time required to transmit one data word. The transmitter 16 is then deactivated for a short random period of time, determined by a random number generator in the code of the microcomputer 44, after which the transmission of the data word can be repeated. This sequence can be repeated "N" number of times where the bit error rate (BER) is improved by multiple transmissions of the same data. For example, if the BER in one burst ($P_B$) is one bit in error in 32 bits (1/32), then in the next repetition the BER is (1/32) (1/32)=1/1024. In general, BER $=(P_B)^N$. The preamble segment of each data word is used to activate and synchronize the timing used in a digital data decoding algorithm in the microprocessor 112 of central receiver unit 102. The algorithm checks the validity of each 32-bit word (i.e., ensures that simultaneous reception of burst data words is detected) by using the following error detection strategy:

1. A first data word in the burst must be identical to at least one following data word before data is considered valid;
2. No data bits following the data word; and
3. The parity of the data word field must agree with the transmitted parity bit in the received word.

In the present system, if eight bits plus a parity bit of data are transmitted in each word, five bits can be used to uniquely identify 31 sensors in the multiple point wireless monitoring system 80. Using 31 sensors and a monitoring interval of 60 seconds, the system 80 would be busy fourteen percent of the time as shown by equation 1:

$$E(\text{Erlangs}) = \frac{nTN}{T} = \frac{(5)(0.054\text{ sec})(31\text{ sensors})}{60\text{ sec}} = .139\text{ Erlangs},$$

where
n = number of 32-bit word replications;
T = transmitter activation time (seconds);
N = number of sensors;
T = sampling interval; and
E = system busy time percentage.

The sleep-timer interface circuit 28 controls the sampling interval "T" in equation 1. This is an important parameter because the life of battery 32 depends on the sampling interval as well as on transmiter on time and battery capacity. Thus, as shown in the following table, the life of battery 32 (in days) can be greatly extended by utilizing the random sampling technique of the present invention.

High Magnetic Moment Transmitter Battery Life in Days
(Transmission on time of 300 milliseconds)

| Sampling Interval | Ampere-hour Capacity of Battery 2.5 | 5.0 | 10.0 |
|---|---|---|---|
| Hourly | 1406 | 2812 | 5624 |
| Every Minute | 23 | 46 | 96 |
| Continuous | 0.1 | 0.2 | 0.4 |

The random time between sampling helps prevent contention in sensor transmissions that are initiated at the same time. Thus, the probability of contention occuring with each subsequent burst is reduced to an insignificant number.

The multiple point wireless monitoring system 80 utilizes the electrical conductors 98 and the set-up room cable 104 as a signal distribution network (utility mode). Signals are also transmitted through the natural waveguide mode formed by a natural resource medium, such as the coal deposit 84, bounded above and below by rock having a different conductivity than the natural resource medium. The transmission of data containing radio signals in both the utility and natural waveguide modes is technically and operationally superior to systems that require a pair of wires or coaxial cable for data transmission because rock falls, fire and accidental machinery movement often cause cable failure with the latter systems.

The operating range of the multiple point wireless monitoring system 80 using various transmission modes is given below:

| Operating Range of System 80 (Without Repeater) | |
|---|---|
| Signal Path | Range |
| HIGH MAGNETIC MOMENT TRANSMITTER | |
| Through Coal Seam | 500 to 1,400 ft |
| Along AC Power Cable | 5,000 to 8,000 ft |
| Unshielded Pair Cable | 10,000 to 33,000 ft |
| Conveyor Belt Structure | more than 18,000 ft |
| Along Drill Rod | more than 5,000 ft |
| LOW MAGNETIC MOMENT TRANSMITTER | |
| Shielded AC Power Cable | 15,000 ft |

The measurement while drilling apparatus 170, shown in FIG. 5, functions analogously to the multiple point wireless monitoring system 80. Data generated by the sensor 24 within the HMM unit 92 is converted to a series stream of digital data which is used to frequency modulate a carrier signal. The transmitter 16 sends the FM modulated signal to the antenna 100. The close proximity of the antenna 100 to the surface of the drill rod 172, ensures a highly efficient magnetic coupling to the drill rod 172. The antenna 106, connected to the central receiver unit 102, is positioned to receive the FM electromagnetic wave signal propagating along the drill rod 172. Alternatively, signals could be transmitted from the central receiver unit 102 and antenna 106 to the antenna 100 and HMM data unit 92.

The multiple point wireless monitoring system 80, the polled data transmission system 190 and the measurement while drilling apparatus 170 all employ electrically short magnetic dipole antennas to launch utility and natural waveguide mode signals. Magnetic dipole antennas are vastly superior to electric dipole antennas because for an electric dipole antenna operating in the vicinity of a sightly conducting rock medium, the radial wave impedance value is largely real. Thus, a great deal of energy is dissipated. With magnetic dipole antennas, the magnetic dipole wave impedance is imaginary, thus dissipating little energy.

The magnetic dipole antennas 36, must be oriented so that the magnetic dipole can excite natural waveguide mode wave propagation or utility mode current flow. With the tuned loop antennas 100 and 106, this is accomplished by orienting the loop 182 relative to the conductor 186 as shown in FIG. 6. With the ferrite rod antenna 94, the rod longitudinal axis should be oriented parallel to the longitudinal axis of the electrical conductor 186.

R. F. Harrington, in "Time-Harmonic Electromagnetic Fields", McGraw Hill Book Company, page 234 (1961), shows that when the electric field "E" is polarized with the axis of a utility conductor, the current induced in the conductor is given by equation 2:

$$I=2\pi E/j\omega u\ Ln\ (Ka) \qquad (2)$$

where u = magnetic permeability;

a = conductor radius;

K = medium wave propagation constant;

$$j=\sqrt{-1}$$

$\omega$ = radio signal frequency (radians/sec);

Ln = natural logarithm; and

E = intensity of the electric field component (volts/meter).

Thus, when physical antennas are located in close proximity to an electrical conductor, high monofilar current flow is generated in the conductor.

The multiple point wireless monitoring system 80 is useful to achieve automatic control of the roof support system in a coal mining system which utilizes roof supports such as the longwall shields shown in FIG. 4. Data generated by the coal layer detector 118 is transmitted as a first signal to the machine automation control unit 125. The first signal includes information on the thickness of the coal deposit 84 and is transmitted to control unit 125 by inductive coupling to the metal body of the coal cutting machine 124 and the ranging arm 122. In response to the data, the control unit 125 activates the electrohydraulic system of the machine 124, which can alter the mechanical functioning of the machine 124. For example, the ranging arm 122 may be raised or lowered or the machine 124 instructed to advance or stop. Additionally, the transceiver 152 may transmit a second signal to the roof support automation control unit 148. The second signal activates the electrohydraulic system of the longwall shields 96 and causes, for example, the vertical hydraulic ram 140 to supply increased roof support pressure. Alternatively, by activating the horizontal hydraulic ram 136, the longwall shield 96 may be drawn closer to the pan line 138 or moved farther back.

In practice, a plurality of the longwall shields 96 each receive the same second signal transmitted by the control unit 125. However, an ID bit in the MSK decoder signal may be used to activate a specific longwall shield 96.

In FIG. 7, the polled data transmission system 190 communicates data between the control and monitoring computer 220 and the remote monitoring and control units 192 by utilizing the plurality of repeaters inductively coupled to the utility conductor 200 via the antennas 238, 206, 210, 214, 218 and 193. The term "polled system" refers to the activation of a remote unit when a signal carrying an assigned identification code is received at the remote unit. The computer 220 generates a digital data word that is sent to the MPC module 226 via the port 224. The audio line pair driver 228 communicates the signal to the base station audio driver 232. Either the MPC module 226 or the MPC module 234 can be used to convert the digital word to an MSK modulated signal as was previously explained in relation to the multiple point wireless monitoring system 80. The transceiver 236, which is inductively coupled to the utility conductor 200, transmits the MSK modulated signal on the frequency $F_2$. The access repeater 197 receives the signal and simultaneously retransmits it at the frequency $F_3$ for distribution throughout the mine 194. The frequency $F_3$ is in the low frequency range because low frequency signals have lower attenuation rates and thus are more efficiently transmitted over long distances. The listening repeaters 198 receive the $F_3$ signal and simultaneously retransmit it at the frequency $F_1$ which is more efficiently received by the control units 192. The remote monitoring and control units 192 receive the $F_1$ signal at the transceiver 248. The MSK signal is sent to the MPC 249 where the address is checked. If the address matches a particular control unit 192, the MPC 249 initiates an appropriate output signal which is applied to the interface unit 259 that controls the machine control system 258. Upon execution of a computer data word command, the MPC 249 may measure sensor data through the input circuits 252 and initiate transmission back to the control and monitoring computer 220 through the repeater network by transmitting a signal from the transceiver 152 at the frequency $F_2$ to the access repeater 197. Additionally, the magnetic field from the $F_2$ signal can be received by the antenna 241 and used to change the capacitor 242 of the passive transponder 240. The transponder 240 can then use the UHF transmitter 244 to transmit a signal to other equipment in the mine 194. Similarly, the UHF transmitter 244 can communicate with the UHF receiver 254 in the remote monitoring and control unit 192 for activating the input circuits 252 or the output circuits 250 or for transmitting a signal from the transceiver 152. The passive transponder 240 can be used to locate the position of mobile equipment in the mine 194. For example, the transceiver 201 would transmit the signal of frequency $F_4$, which could be a 750 kHz signal, to the transponder 240. The $F_4$ signal would charge the capacitor 242 which wold cause the transmission of the UHF signal to be transmitted from the transmitter 244.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A method for transmitting data from a drillhead, while drilling, to a control unit which comprises:

positioning a tuned loop antenna adjacent to and about an exterior surface of a drill rod adjacent to and intermediate a geological medium and said drillhead for measuring geological parameters of said medium, said tuned loop antenna being magnetically coupled to said drill rod;

positioning a data transmission unit inside said drill rod, and inductively connected to said tuned loop antenna, said data transmission unit providing a series stream of digital data to frequency modulate a carrier signal which is transmitted along said drill rod;

inductively coupling a central receiver unit to said drill rod to receive a frequency modulated electromagnetic wave signal propagating along said drill rod; and transmitting a plurality of data from the central receiver unit to a control unit.

2. The method of claim 1 further including the steps of:

converting the plurality of data to a digital word format prior to transmission.

* * * * *